May 29, 1945. B. D. MORGAN 2,377,170
FLUID POWER MECHANISM
Filed Sept. 11, 1942 2 Sheets-Sheet 1
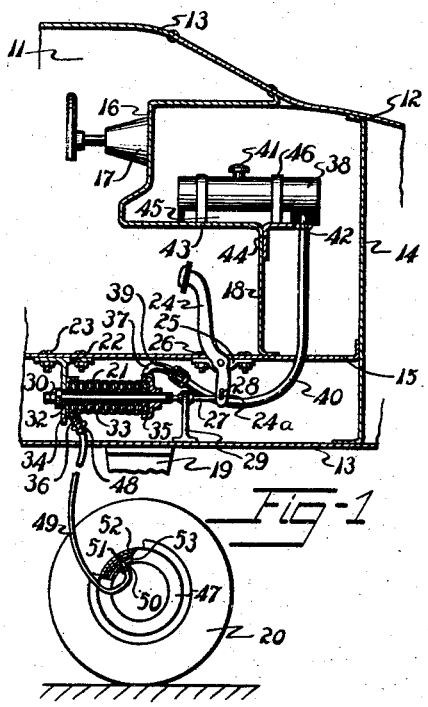
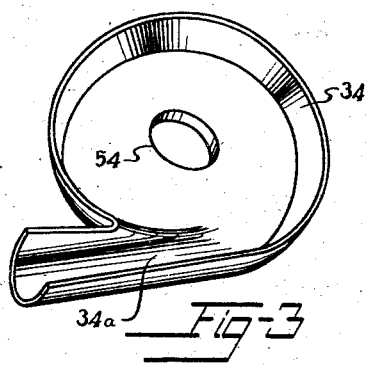
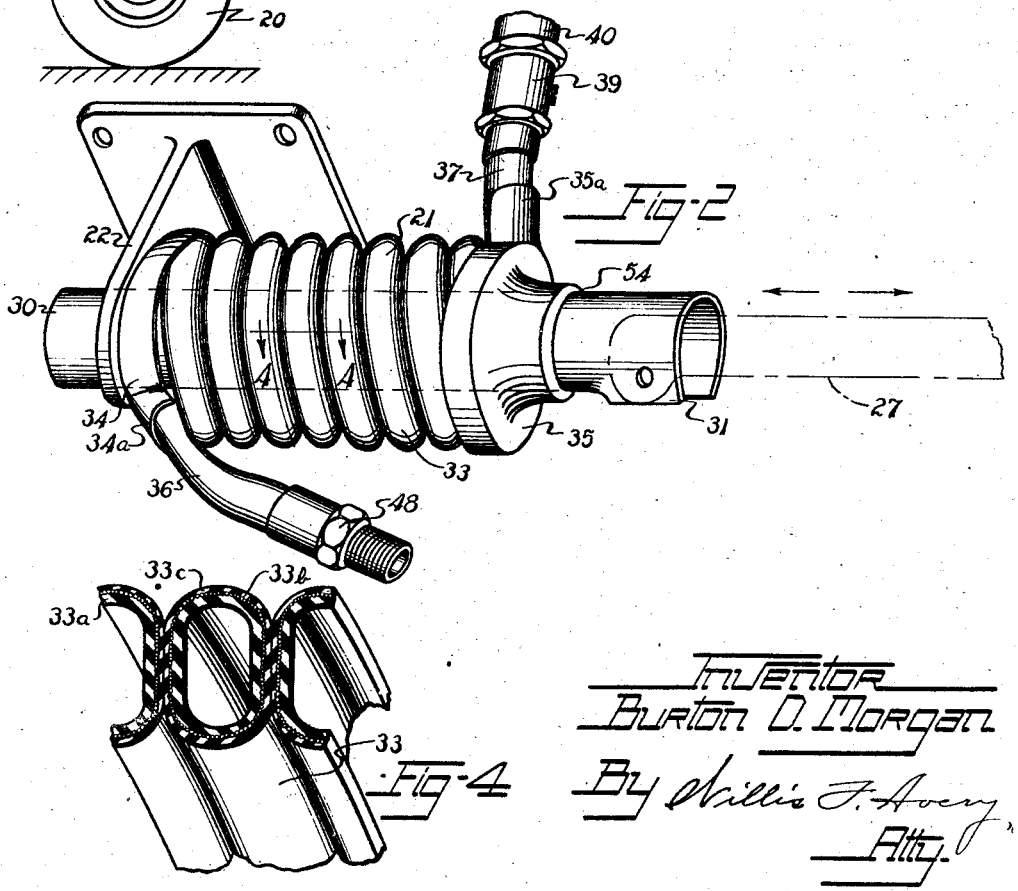
Inventor
Burton D. Morgan
By Willis F. Avery
Atty.

May 29, 1945. B. D. MORGAN 2,377,170
FLUID POWER MECHANISM
Filed Sept. 11, 1942 2 Sheets-Sheet 2
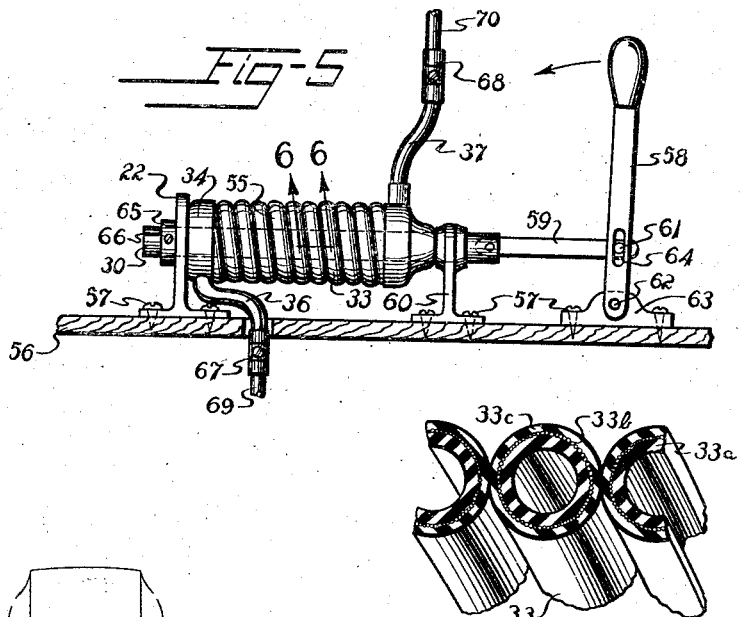
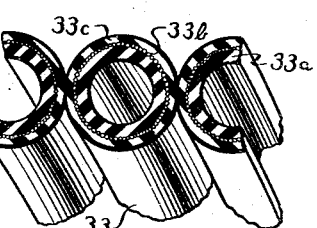
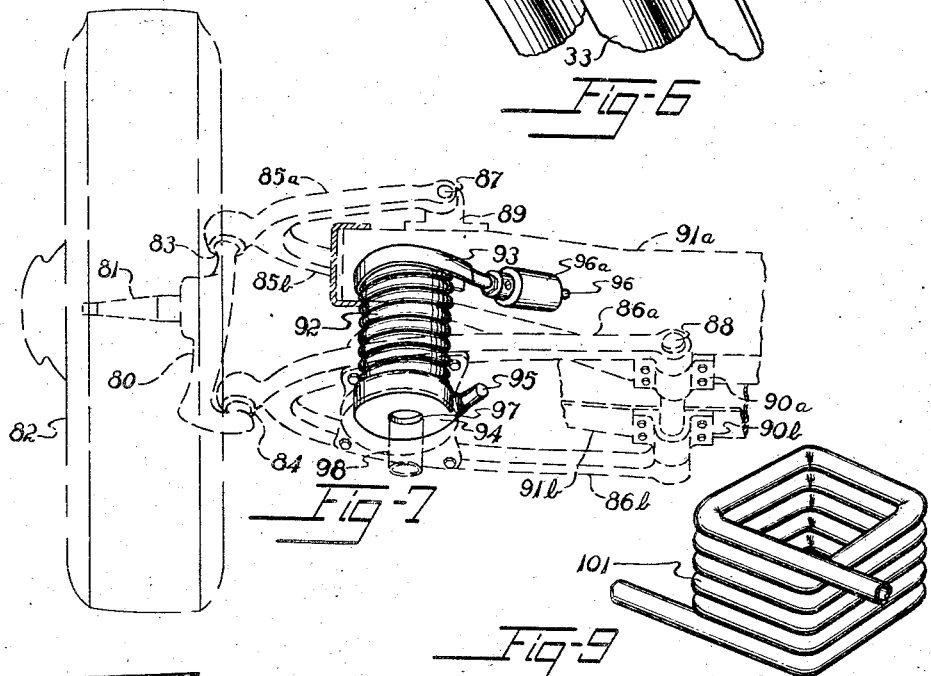
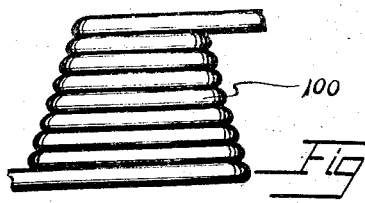
Inventor
Burton D. Morgan
By Willis F. Avery
Atty.

Patented May 29, 1945

2,377,170

UNITED STATES PATENT OFFICE 2,377,170

FLUID POWER MECHANISM

Burton D. Morgan, Akron, Ohio, assignor to The B. F. Goodrich Company, New York, N. Y., a corporation of New York Application September 11, 1942, Serial No. 457,918

3 Claims. (Cl. 60—54.6)

This invention relates to fluid power mechanisms, especially mechanisms utilizing fluid in their capacity for action or to be acted upon in the conversion of mechanical to fluid transmission of force, or vice versa, and is useful in some of its aspects in its application to a variety of mechanisms, such, for example, as fluid-operated brakes, pumping apparatus, and even springing structures.

Objects of my invention are to provide a fluid power mechanism which has simplicity of construction, and to provide at the same time for ease of manufacture and effectiveness of operation. Further objects are to provide a mechanism which is capable of altering the pressure of the fluid by change of volume in the case of air or other compressible fluid, and to provide for displacing the fluid with or without a change of volume of the fluid by virtue of distortion of flexible and preferably resilient wall portions of the fluid container, which portions are preferably arranged in adjacent relation to cooperate with each other.

Another object of the invention is to provide pressure transmitting mechanism of substantially coiled form having wall portions adapted to be pressed toward one another thereby distorting the portions and effectively altering the pressure of fluid therein.

More specific objects of the invention are to provide fluid power mechanisms of helically coiled form capable of transmitting pressure and fluid or of storing energy upon distortion of the convolutions, and to provide for recovering the form of the convolutions after they are distorted along the length of the helix.

A still further object is to make features of the invention available in a variety of fluid-power mechanisms, including brake-operating mechanisms, pumping apparatus and springing structures.

These and other objects and advantages of the invention will be apparent from the following description.

In the accompanying drawings, which form a part of this specification, and in which like numerals are employed to designate like parts throughout the same, Fig. 1 is a vertical section through the pilot compartment portion of an aircraft fuselage including a landing wheel having a fluid-operated brake, showing a fluid power mechanism constructed in accordance with and embodying the invention, Fig. 2 is a perspective view on an enlarged scale of the fluid power mechanism of Fig. 1, Fig. 3 is a perspective view of a cupped member for seating the end convolutions of the coiled tube, Fig. 4 is a section taken along line 4—4 of Fig. 2, Fig. 5 is a side elevation of a pump embodying the invention, Fig. 6 is a section taken along line 6—6 of Fig. 5, Fig. 7 is a perspective view, from below, of a portion of a vehicular suspension including the fluid power mechanism, and Figs. 8 and 9 are perspective views, respectively, of further modifications of the coiled tube.

An embodiment of the invention as applied to the braking system for a vehicle, such as an aircraft, is shown in Fig. 1. A pilot compartment portion 11 of a fuselage 12 is enclosed by an outer covering 13 including a windshield, and a bulkhead 14 to which is secured a floor plate 15. An instrument board 16 having a control structure 17 is supported by an intermediate wall 18 attached to the floor 15. As illustrated in Fig. 1, the fuselage 11 is supported by an undercarriage having struts and landing wheels, each one being shown at 19 and 20 respectively.

There may be two fluid power mechanisms 21 for two landing wheels, each mechanism being manually operable at the discretion of the pilot to transmit fluid pressure to the braking unit of one of the wheels; hence permitting selective control of the braking force applied to the respective wheels 20 whereby the aircraft may be steered on the ground.

The fluid power mechanism 21 is held in place, preferably beneath the floor 15, by a mounting pedestal 22 secured to the floor by bolt fasteners 23 or other suitable means and by a supporting member 29 secured to the outer cover 13. A foot pedal 24 is mounted pivotally upon a supporting bracket 25 also attached underneath the floor by bolt fasteners 26. The lower portion of the foot pedal 24 extending through an opening in the floor has a slotted aperture 24a in which one end of a link 27 is movably secured by a pin connector 28, the other end of the link 27 being secured to a hollow tubular rod 30 at its forked end 31. The link 27 extends through a guiding aperture in the supporting member 29 and is maintained thereby in alignment with the tubular rod 30. This arrangement provides for changing the oscillatory movement of the foot pedal 24 to reciprocatory movement of the tubular rod 30 in the direction generally along the floor 15, and prevents binding of the rod 30 with the bearing surface of an aperture 32 in the downwardly depending portion of the pedestal 22.

A flexible-walled tube 33 in helically coiled form having a plurality of convolutions about the tubular rod 30 is disposed such that the rod slides freely within the central space under all operating conditions of the tube. The end convolutions may be positioned within cupped members 34 and 35 having openings 34a and 35a through which end portions 36 and 37 of the tube 33 project outwardly. The cupped members which have axial apertures 54 to permit extending the rod 30 therethrough, may be identical in structure, as shown in Fig. 3.

The tube 33 may comprise an inner lining 33a of rubber-like material upon which is disposed a reinforcement 33b which may comprise fabric or stranded material of cord, wire, or other suitable elements woven, braided or laid in a manner to provide the desired strength and flexibility. Upon this reinforcement may be disposed a protective cover 33c of rubber-like material. With this arrangement the tube is capable of withstanding internal pressure and flexure of its walls, and is capable inherently of resuming its starting condition or nearly so upon distortion by virtue of the resilience of the walls thereof. The convolutions of the tube 33 may be secured together in their contacting relation, as by an adhesive rubber cement or by a vulcanized bond, to prevent movement and slipping thereof. According to the nature of the reinforcement used, the walls of the tube may be stretchable or substantially non-stretchable as desired for particular applications.

It is desirable to attach the cupped member 34 to the pedestal 22, in the manner shown in Figs. 1 and 2, as by spot welding or other suitable fastening means; whereas the other member 35 is secured to the tubular rod 30 as by set-screws or welding. Preferably, the member 35 is positioned in a manner such that the tube 33 convolutions are pressed together along the helix whereby the axial length of the helix is partly reduced thus causing the tube 33 to assume an approximately oblate shape in section, as shown, for example, in Fig. 4.

Because of this pressing action, the resilient walls of the tube 33 are in a stressed condition and tend to assume their original form; hence an axial force is exerted by the tube wall through the member 35 and the rod 30 upon the link 27 and in turn upon the foot pedal 24. In this manner the pedal resumes and maintains its original position upon the release of pressure thereon by the pilot or when the mechanism is inoperative, obviating the need, for example, of auxiliary return springs. This return action is assisted in the case of residual pressure in the fluid.

Referring especially to Figs. 1, 2, 4 and 6, the tube 33 may be made circular in section so as to have maximum internal cross-sectional area and maximum volume displacement per unit of length, when not under compression. However, when the convolutions of the tube are pressed initially together, as described hereinabove, the cross-sectional area and the internal displacement per unit of length are reduced because of the oblate or non-circular form in section. Upon further compressive force being applied axially along the helically coiled tube 33, the oblate form is altered progressively to a shape more remote from the circular, whereby the internal volume is decreased and fluid therein flows under pressure to the desired location or pressure builds up. The resilient wall of the tube, in the case it is somewhat extensible, is distended to a limited extent during the compressive action by the pressure of the fluid acting upon it but it tends to resist such deformation and to regain its former condition upon the release of the compressive force by virtue of the resilient construction.

The proportions and size of the tube 33, such as the internal diameter of the tube and of the helix and the number of convolutions, are varied to meet the requirements of the particular application as to changes in fluid volume and pressure. Also, for some applications, such as the fluid power mechanism for brakes, the coils of the tube 33 may be pressed together initially to an extent such that they are somewhat non-circular in section and such that each successively additional increment of compression produces substantially an approximately equal decrement in volume displacement.

Other coil forms, as well as the strictly helical, may be employed for the tube structure, if desired. For example, the tube may be spirally wound as at 100 in Fig. 8, or substantially square in form as at 101 in Fig. 9.

As shown in Fig. 1, one end 37 of the tube 33 is interconnected with a fluid reservoir 38 by a check valve fitting 39 and a conduit 40, the reservoir functioning to charge the system with a suitable fluid, such as brake oil, and to compensate for subsequent fluid losses. The fluid reservoir 38 including an inlet and cap 41 and an outlet connector 42 to which the conduit 40 is connected, is mounted upon a shelf extension 43 of the instrument board 16 and an auxiliary bracket 44 by longitudinal supports 45 and straps 46 with bolt fasteners. The other end 36 of the tube 33 is interconnected with a fluid-operated brake 47 by a fitting 48, a flexible conduit 49 and a lead 50. Suitable bleeding means for venting air may be provided in the system, as desired.

The fluid-operated brake, shown by way of example in Fig. 1, comprises shoes 51 forced against a brake drum 52 by an inflatable annular ring or tube 53, the fluid under pressure communicating with the ring 53 through the lead 50. It is to be understood that the fluid power mechanism 21 of the invention is useful also with other suitable types of fluid-operated brakes.

In the operation of the mechanism shown in Fig. 1, the braking system being fully charged with brake fluid, the foot pedal 24 is moved forwardly of the aircraft which imparts a backward movement through the linkage structure to the tubular rod 30 in the manner previously described. This movement of the rod presses axially together and distorts the convolutions of the helically coiled tube 33 disposed between the cupped members 34 and 35 forcing the fluid therein to flow under pressure through the conduit 49 into the inflatable ring 53, the check valve 39 effectively preventing fluid flow to the reservoir 38. A limited axial movement of the rod 30 and cupped member 35 is effective to cause the transmittal of the required volume of fluid under pressure to the inflatable ring 53 of the brake 47. The rod 30 assists to stabilize the coils of the tube 33 in the lateral direction, although the coils themselves possess considerable inherent stability. The ring 53 is distended by the fluid and presses the shoes 51 against the brake drum 52, thus securing the desired braking action which is regulated by the extent of the pressure exerted upon the foot pedal 24.

For the reverse part of the cycle, upon the cessation or reduction in the amount of forward force upon the foot pedal 24, the fluid pressure within and the compression of the helically coiled tube 33 are diminished permitting the brake fluid to flow back and refill the space within the tube 33 under a return pressure action of the brake structure 47, hence ending or reducing the braking effect upon the landing wheel 20. In addition to the pressure of the returning fluid acting to restore the tube 33 and hence the fluid power mechanism 21 to its starting condition, the helically coiled tube 33 assists appreciably in such restorative action by virtue of the axially forward force due to the stressed condition of the resilient walls, as hereinabove described. When the foot pedal 24 is inoperative and in its starting position, the check valve 39 is open for permitting fluid to flow from the reservoir 38 to compensate for fluid losses.

The fluid power mechanism is applicable also as a pressure transmitting means for pumping fluids, such as air, water and oil. Fig. 5 illustrates an embodiment of the invention operative as a pump mechanism 55. One end of the tubular rod 30 is supported by the pedestal 22 and the cupped member 34 which is united with the pedestal by spot welding or other suitable fastening means. The pedestal 22 is secured to a base 56, for example a floor structure or table-top, by suitable fasteners, such as wood screws 57. The other end of the tubular rod 30 is supported by an apertured support member 60 and is secured to a link 59 and connected to a handle 58 through the link 59 having a pin connector 61.

The handle is mounted pivotally upon a shaft 62 and a bearing block 63 secured to the base 56 by wood screws 57, and has an elongated aperture 64 in its lower portion in which the pin 61 is positioned movably in order to provide for reciprocating motion of the tubular rod 30 notwithstanding the oscillating motion of the handle. The rod 30 slides freely within the apertures in the member 60 and pedestal 22 and cupped member 34. Forward movement of the handle 58 is limited by a collar 65 secured to the rod 30 by a set-screw 66 or other suitable fastening means; while the backward movement is controlled by the amount of compression of the tube 33 between the cupped members 34 and 35 which is caused by the force exerted upon the handle 58.

The cupped member 35 is positioned upon the rod 30 in a manner such that the convolutions of the tube 33 may or may not be under an initial compression sufficient to produce an oblate form in section, and is secured by welding, or set-screws, or other suitable fastening means. In the self-returning action of the handle 58, for providing maximum fluid displacement with minimum extent of handle movement, it is desirable that the convolutions be under the initial compression, as noted above, in order to produce a restoring force by virtue of the resilience of the walls of the tube 33. However, the tube 33, as shown in Figs. 5 and 6, is not under the initial compression, hence permitting maximum fluid displacement with maximum pivotal movement of the handle 58.

Suitable check valves 67 and 68 are connected to the ends 36 and 37 of the tube 33, which ends project outwardly from the cupped members 34 and 35, these valves being also connected to inlet and outlet conduits 69 and 70, respectively.

In the operation of the pump the handle 58 is advanced, thereby compressing the helically coiled tube 33 due to the movement of the rod 30 and the cupped member 35 towards the cupped member 34 and the pedestal 22, the rod 30 moving within the coiled tube 33 and through registered apertures in the member 34 and pedestal 22 and preventing objectionable lateral movement of the coils. At the start of such compression the inlet valve 67 closes and the outlet valve 68 opens permitting displaced fluid in the tube 33 to flow through the outlet conduit 70, the quantity of flow being dependent upon the extent to which the convolutions are pressed together. When the handle 58 is next retracted until stopped by the collar 65 contacting the pedestal 22, the inlet valve 67 opens and the outlet valve 68 closes permitting fluid to refill the tube 33 as the latter regains its original condition by virtue of the resilience of the walls thereof, assisted by any back pressure existing in the fluid, during which action fluid is drawn through the valve 67 thus completing the cycle.

The invention is applicable to changing fluid pressure to mechanical pressure as well as the reverse. For example, in Fig. 7 is shown an embodiment adapted for use as a spring in a vehicular suspension. A wheel supporting member 80 including a spindle 81 upon which a wheel 82 is mounted, is pivoted in ball and socket joints at its upper and lower ends 83 and 84 to laterally extending wishbone control arms 85a and 85b and 86a and 86b respectively. These control arms are pivoted at their inner ends at 87 and 88 in mounting brackets 89 and 90a and 90b attached to a frame structure 91a and 91b as by welding or bolts.

A helically coiled tube 92 having walls of resilient reinforced-rubber or other suitable material is supported in cupped members 93 and 94, like that of Fig. 3, which are attached, as by welding or bolts or both, to the lower control arms 86a and 86b and to the frame structure 91a and 91b, respectively. For lateral stability of the coil, a tubular guide rod 98 may be secured to the upper cupped member 93 and may be disposed within the coiled tube 92 to permit reciprocatory movement of the rod through a suitable aperture 97 in the lower member 94.

The lower end of the tube 92 is sealed by a closure element 95 and the upper end is sealed by a closure and check valve structure 96 which provides for filling the tube with a suitable fluid, such as oil or water, under pressure for maintaining the vehicle at the desired elevation and for preventing undesirable collapsing of the tube 92 under loaded conditions. As discussed more fully hereinafter, a damping device or shock absorber 96a, including a reservoir, may be included at the end of the tube 92.

It is to be understood that each road wheel of the vehicle may be resiliently supported from the vehicle frame in the manner shown in Fig. 7. With such an arrangement, when the wheel 82 is deflected, the pivoted control arms 85a and 85b and 86a and 86b are deflected in a generally upward and downward direction. The helically coiled tube 92 operates resiliently to restrain upward swinging movement of the control arm 86a and 85b relatively to the frame 91a and 91b, by virtue of the rapid rise in pressure of fluid therein and the resistance to distention of the resilient walls thereof. The magnitude of the pressure rise and the extent of the distention of the walls varies with the amount of wheel deflection in a manner providing a springing action, a suitable valved reservoir 96a being preferably provided in the case where a non-compressible liquid medium is used so that expansion of the tube wall need not be relied upon for springing deflection and a substantially non-stretchable tube reinforcement may be used.

Alternatively, for pneumatically springing the vehicle the tube 92 is filled with a gas, such as air, under pressure. With such an arrangement a variable springing "rate" is obtained by virtue of the compression of the gas when the tube 92 is reduced along its axial length under loaded conditions. The resistance to distention of the resilient walls of the tube 92 permits confining the gas within a substantially inexpansible container; hence the extent of the compression of the gas varies with the extent of the deflection of the tube, and the resistance to collapsing of the tube 92 increases with each increment in compression of the gas due to road wheel deflection. In this manner a desirable springing action is secured which action is "soft" for low pressures and "hard" for high pressures of the gas.

If desired, the pressure fluid of the spring, whether gas or liquid, may be utilized in a damping device 96a of the restricted orifice and reservoir or other suitable type, which conveniently may be connected as for example as shown in Fig. 7 at the end of the tube 92 before the closure and check valve 96, so that use of the same fluid for springing and damping is made possible.

Variations may be made without departing from the scope of the invention as it is defined in the following claims.

I claim:

1. Pressure transmitting mechanism for a brake, said mechanism comprising a helically coiled tube of resilient-walled material including circumferentially disposed reinforcement in the wall for resisting expansion of the tube and having a plurality of abutting convolutions, a fluid reservoir, means for regulating the flow of fluid from said reservoir to said coiled tube, means in communication with said coiled tube for conducting fluid to and from the brake, means for maintaining said convolutions normally pressed toward one another a determinate extent, and means for pressing the said convolutions toward one another to reduce the axial length of the helix thereby distorting the wall of the tube along the helix.

2. A fluid brake power mechanism comprising a guide rod, a helically coiled tube of resilient-walled material including circumferentially disposed fabric reinforcement for resisting expansion of the tube and having convolutions disposed helically about said rod, spaced-apart cupped members having apertures for receiving said rod and disposed adjacent the respective end convolutions of said tube, one of said members being attached to the guide rod and the other member being in sliding engagement therewith, means attached to said rod adjacent the latter said member for positioning said cupped members a determinate distance apart whereby said convolutions are maintained normally pressed toward one another to hold them in non-circular form in section, and means for moving said guide rod axially of said tube for pressing said convolutions toward one another to reduce the axial length of the helix thereby distorting the wall of the tube.

3. A fluid-brake power mechanism adapted to transmit power to a brake, said mechanism comprising a guide rod, a tube of resilient material including reinforcement disposed in the wall of the tube circumferentially of the tube in cross-section, said tube being disposed in convolutions helically about said rod, spaced-apart end members mounted on said rod and disposed adjacent the respective end convolutions of said tube, one of said members being attached to said rod and the other member being in sliding engagement therewith, means on said rod adjacent the latter said member for limiting said members to a determinate separating distance in which said convolutions are maintained normally in partially flattened form in section, and means for moving the guide rod and the attached member in the axial direction of said tube for pressing said convolutions further toward one another to reduce the axial length of the helix thereby distorting the wall of the tube.

BURTON D. MORGAN.